US012573860B2

(12) United States Patent (10) Patent No.: US 12,573,860 B2
Zhao (45) Date of Patent: Mar. 10, 2026

(54) BATTERY CHARGING/DISCHARGING CONTROL SYSTEM AND ELECTRONIC DEVICE

(71) Applicants: K-Tronics (Suzhou) Technology Co., Ltd., Suzhou (CN); BOE Technology Group Co., Ltd., Beijing (CN)

(72) Inventor: Liushuai Zhao, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 712 days.

(21) Appl. No.: 17/921,985

(22) PCT Filed: Aug. 4, 2021

(86) PCT No.: PCT/CN2021/110621
§ 371 (c)(1),
(2) Date: Oct. 28, 2022

(87) PCT Pub. No.: WO2022/052684
PCT Pub. Date: Mar. 17, 2022

(65) Prior Publication Data
US 2023/0179004 A1 Jun. 8, 2023

(30) Foreign Application Priority Data

Sep. 9, 2020 (CN) .......................... 202010943555.5

(51) Int. Cl.
*H02J 7/00* (2006.01)
*H01M 10/44* (2006.01)
(Continued)

(52) U.S. Cl.
CPC ......... *H02J 7/00304* (2020.01); *H01M 10/44* (2013.01); *H01M 10/48* (2013.01);
(Continued)

(58) Field of Classification Search
CPC .. H02J 7/00304; H02J 7/00306; H02J 7/0047; H02J 7/0068; H01M 50/583; H01M 10/44; H01M 10/48
(Continued)

(56) References Cited

U.S. PATENT DOCUMENTS 9,954,207 B2 * 4/2018 Koebler .............. H01M 10/425
2009/0197156 A1 * 8/2009 Goto ..................... H01M 10/48
429/93
(Continued)

FOREIGN PATENT DOCUMENTS

CN 201562728 U 8/2010
CN 103618353 A 3/2014
(Continued)

OTHER PUBLICATIONS

Office Action dated Aug. 25, 2023 for Chinese Patent Application No. 202010943555.5 and English Translation.
(Continued)

*Primary Examiner* — Nathaniel R Pelton
(74) *Attorney, Agent, or Firm* — Ling Wu; Stephen Yang; Ling and Yang Intellectual Property

(57) ABSTRACT

A battery charging/discharging control system and an electronic device, which relate to the technical field of battery charging/discharging. The control system includes: a positive power supply terminal, a negative power supply terminal, a positive battery terminal, a negative battery terminal, a charging/discharging circuit, and a controllable switching circuit. The charging/discharging circuit includes a first sample resistance circuit and a battery protection chip. One end of the first sample resistance circuit is connected to the negative power supply terminal, and there is a first node between the end of the first sample resistance circuit and the negative power supply terminal; and the other end of the first sample resistance circuit is connected to the negative battery terminal. The battery protection chip comprises an overcurrent detection pin, the overcurrent detection pin is connected to the first node.

14 Claims, 6 Drawing Sheets

(51) Int. Cl.
  *H01M 10/48* (2006.01)
  *H01M 50/583* (2021.01)

(52) U.S. Cl.
  CPC ....... *H01M 50/583* (2021.01); *H02J 7/00306*
    (2020.01); *H02J 7/0047* (2013.01); *H02J*
    *7/0068* (2013.01); *H01M 2200/00* (2013.01)

(58) Field of Classification Search
  USPC ......................................................... 320/134
  See application file for complete search history.

(56) References Cited

U.S. PATENT DOCUMENTS

| | | | | |
|---|---|---|---|---|
| 2010/0123437 | A1* | 5/2010 | Takeda ................ | H02J 7/00304 |
| | | | | 320/136 |
| 2015/0022926 | A1* | 1/2015 | Toivola ............... | H02J 7/00306 |
| | | | | 361/92 |

| | | | | |
|---|---|---|---|---|
| 2017/0033574 | A1* | 2/2017 | Imaizumi ............ | H02J 7/00304 |
| 2018/0062410 | A1* | 3/2018 | Sakurai ................. | H02J 7/0068 |
| 2022/0278535 | A1* | 9/2022 | Liu .................... | G01R 31/3842 |

FOREIGN PATENT DOCUMENTS

| | | |
|---|---|---|
| CN | 104600676 A | 5/2015 |
| CN | 104779669 A | 7/2015 |
| CN | 105322620 A | 2/2016 |
| CN | 107248725 A | 10/2017 |
| CN | 209658953 U | 11/2019 |
| CN | 209658958 U | 11/2019 |
| CN | 209658959 U | 11/2019 |
| WO | 2019169541 A1 | 9/2019 |

OTHER PUBLICATIONS

International Search Report for PCT/CN2021/110621 Mailed Oct. 27, 2021.

* cited by examiner

Battery charge and discharge control system 100

Electronic device 1000

FIG. 7

BATTERY CHARGING/DISCHARGING CONTROL SYSTEM AND ELECTRONIC DEVICE

CROSS-REFERENCE TO RELATED APPLICATION

The present application is a U.S. National Phase Entry of International Application No. PCT/CN2021/110621 having an international filing date of Aug. 4, 2021, which claims priority to Chinese patent application No. 202010943555.5, entitled "Battery Charge/Discharge Control System and Electronic Device" filed on Sep. 9, 2020. The above-identified applications are hereby incorporated by reference.

TECHNICAL FIELD

The invention relates to the technical field of battery charging and discharging, in particular to a battery charge and discharge control system and an electronic device.

BACKGROUND

In related technologies, the battery charging circuit of rechargeable electronic devices (such as electronic screen display mobile street signs, commercial displays, billboards, etc.) usually needs a battery charging management IC (Integrated Circuit) for real-time state management of battery charging, and also needs a battery protection IC. Therefore, at present, charging circuit design requires charging management chip, MCU (Micro-controller Unit) and back-end battery protection chip to form a complete battery charging circuit, which makes the circuit design complex and requires a large PCB (Printed Circuit Board) area, which increases the circuit failure rate and production cost.

SUMMARY

The present disclosure is intended to solve one of technical problems in the related art at least to some extent. For this reason, a first object of the present disclosure is to propose a battery charge and discharge control system. The control system can make the circuit design simple and can effectively reduce the circuit board area, thereby reducing the circuit failure rate and production cost.

A second object of the present disclosure is to propose an electronic device.

In order to achieve the above objects, the embodiment of the first aspect of the present disclosure provides a battery charge and discharge control system, wherein the control system includes a power supply positive terminal and a power supply negative terminal, wherein the power supply positive terminal is used for connecting the positive terminal of an external power supply, and the power supply negative terminal is used for connecting the negative terminal of the external power supply; a battery positive terminal and a battery negative terminal, the battery positive terminal is used for connecting a positive electrode of the battery, the battery negative terminal is used for connecting a negative electrode of the battery, and the battery positive terminal is connected to the power supply positive terminal; a charge and discharge circuit, which includes a first sampling resistor circuit and a battery protection chip, one terminal of the first sampling resistor circuit is connected to the power supply negative terminal, a first node is provided between the first sampling resistor circuit and the power supply negative terminal, the other terminal of the first sampling resistor circuit is connected to the negative electrode of the battery, the battery protection chip includes an overcurrent detection pin, and the overcurrent detection pin is connected to the first node; and a controllable switch circuit, which is connected between the first node and the power supply negative terminal, the controllable switch circuit includes a control terminal connected to the battery protection chip, and the controllable switch circuit is configured to turn on or off the connection between the power supply negative terminal and the negative electrode of the battery under the control of the battery protection chip.

The battery charge and discharge control system of the embodiment of the present disclosure has simple circuit design, does not need a charging management chip, can effectively reduce circuit board area, and reduces circuit failure rate and production cost.

To achieve the above object, the embodiment of the second aspect of the present disclosure provides an electronic device, which includes the battery charge and discharge control system described in the above embodiment.

The electronic device of the embodiment of the present disclosure includes a battery charge and discharge control system which has simple circuit design, does not need a charging management chip, and can effectively reduce circuit board area, circuit failure rate and production cost.

Additional aspects and advantages of the present disclosure will be set forth in part in the following description, and part of which will be apparent from the description, or may be learned through practice of the present disclosure.

BRIEF DESCRIPTION OF DRAWINGS

The above and/or additional aspects and advantages of the present disclosure will become apparent and easily understood from the following description of embodiments with reference to the accompanying drawings.

FIG. 7 is a structural block diagram of an electronic device according to an embodiment of the present disclosure.

DETAILED DESCRIPTION

Figure 1:
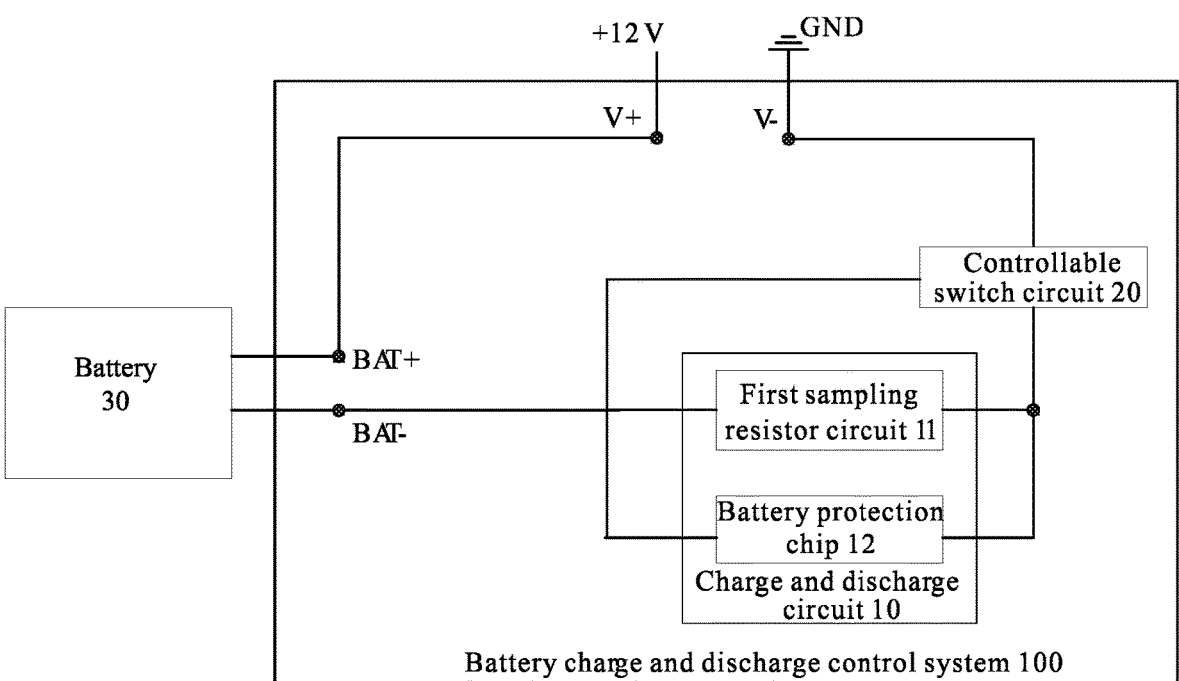
FIG. 1 is a structural block diagram of a battery charge and discharge control system according to a first embodiment of the present disclosure.

The present disclosure is described in detail below, and examples of the embodiments are illustrated in the drawings, in which the same or similar reference signs always having denote the same or similar components or components having the same or similar functions. The embodiments described below with reference to the drawings are illustrative, and are merely intended to explain the present disclosure, which cannot be interpreted as a limitation of the present disclosure.

At present, the charging circuit of rechargeable electronic device (such as electronic screen display mobile street signs, commercial displays, billboards, etc.) includes battery charging management IC (such as TP4055, TP4057 chips, etc.), MCU, and battery protection chip. The battery charging management IC is used to control charging voltage and charging current to achieve constant voltage and constant current charging. The battery protection chip is used to protect the battery, such as preventing the battery from overcharging and overdischarging. The MCU is used to obtain battery state, such as charge state, full state, abnormal battery connection state, etc. The specific working flow of the charging circuit above is as follows: when the charging circuit is connected to an external power supply, if the battery charging management IC detects that the battery voltage is lower than a smaller value, the battery is charged through a trickle charging mode. If the battery charging management IC detects that the battery voltage reaches a larger value, the battery is charged in a constant current mode. When the battery voltage reaches the floating charging voltage, the battery charging management IC charges the battery in a constant voltage mode until the charging current decreases to trickle current. During the charging process, the MCU can determine the battery state according to the pin state of the battery charging management IC, and corresponding prompt information is sent out according to the battery state to remind the battery state. At the same time, the battery protection chip can protect the battery according to the voltage, current and other parameters of the battery.

It can be seen that the battery charging process in the above technologies depends on the battery charging management IC. However, the application of the battery charging management IC not only increases the design area of the circuit board, but also increases the failure rate and production cost of the battery charging circuit.

Battery charge and discharge control systems and electronic devices of embodiments of the present disclosure are described below with reference to FIGS. 1-7.

FIG. 1 is a structural block diagram of a battery charge and discharge control system according to an embodiment of the present disclosure. As shown in FIG. 1, the battery charge and discharge control system 100 includes a power supply positive terminal V+, a power supply negative terminal V−, a battery positive terminal BAT+, a battery negative terminal BAT−, a charge and discharge circuit 10, and a controllable switch circuit 20.

Wherein the power supply positive terminal V+ is used for connecting with the positive terminal of an external power supply such as a 12V power supply, and the power supply negative terminal V− is used for connecting with the negative terminal of an external power supply such as the 12V power supply and is grounded GND. The battery positive terminal BAT+ is connected to the positive electrode of the battery 30, the battery negative terminal BAT− is connected to the negative electrode of the battery 30, and the battery positive terminal BAT+ is connected to the power supply positive terminal V+. When the external power supply is connected, the external power supply charges the battery 30.

The charge and discharge circuit 10 includes a first sampling resistor circuit 11 and a battery protection chip 12, one terminal of the first sampling resistor circuit 11 is connected to a power supply negative terminal V−, and a first node is provided between the first sampling resistor circuit 11 and the power supply negative terminal V−, and the other terminal of the first sampling resistor circuit 11 is connected to the negative electrode of the battery 30. The battery protection chip 12 includes an overcurrent detection pin (such as a VINI pin shown in FIG. 2), and the overcurrent detection pin is connected to the first node.

Figure 2:
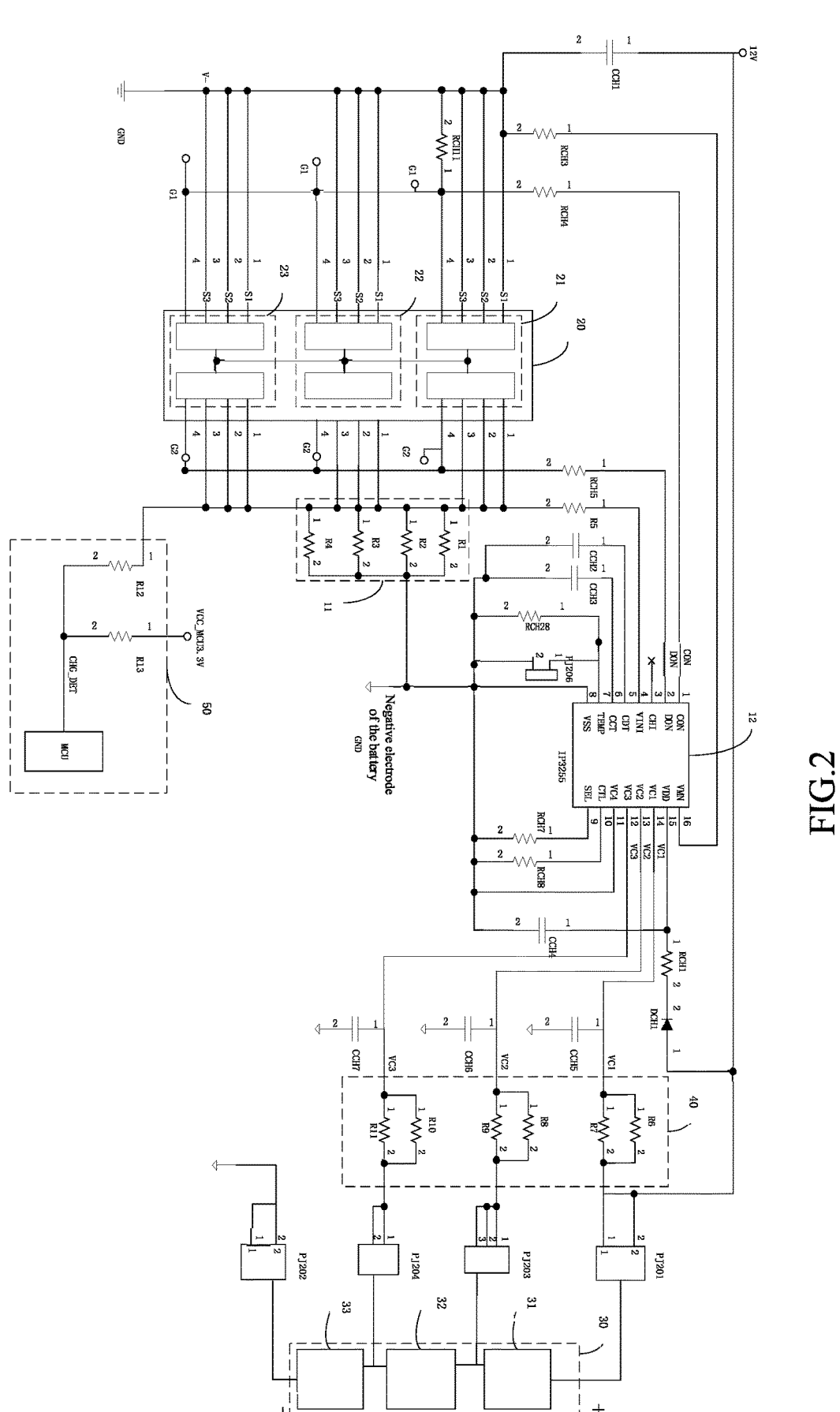
FIG. 2 is a circuit diagram of a battery charge and discharge control system according to a specific embodiment of the present disclosure.
Figure 3:
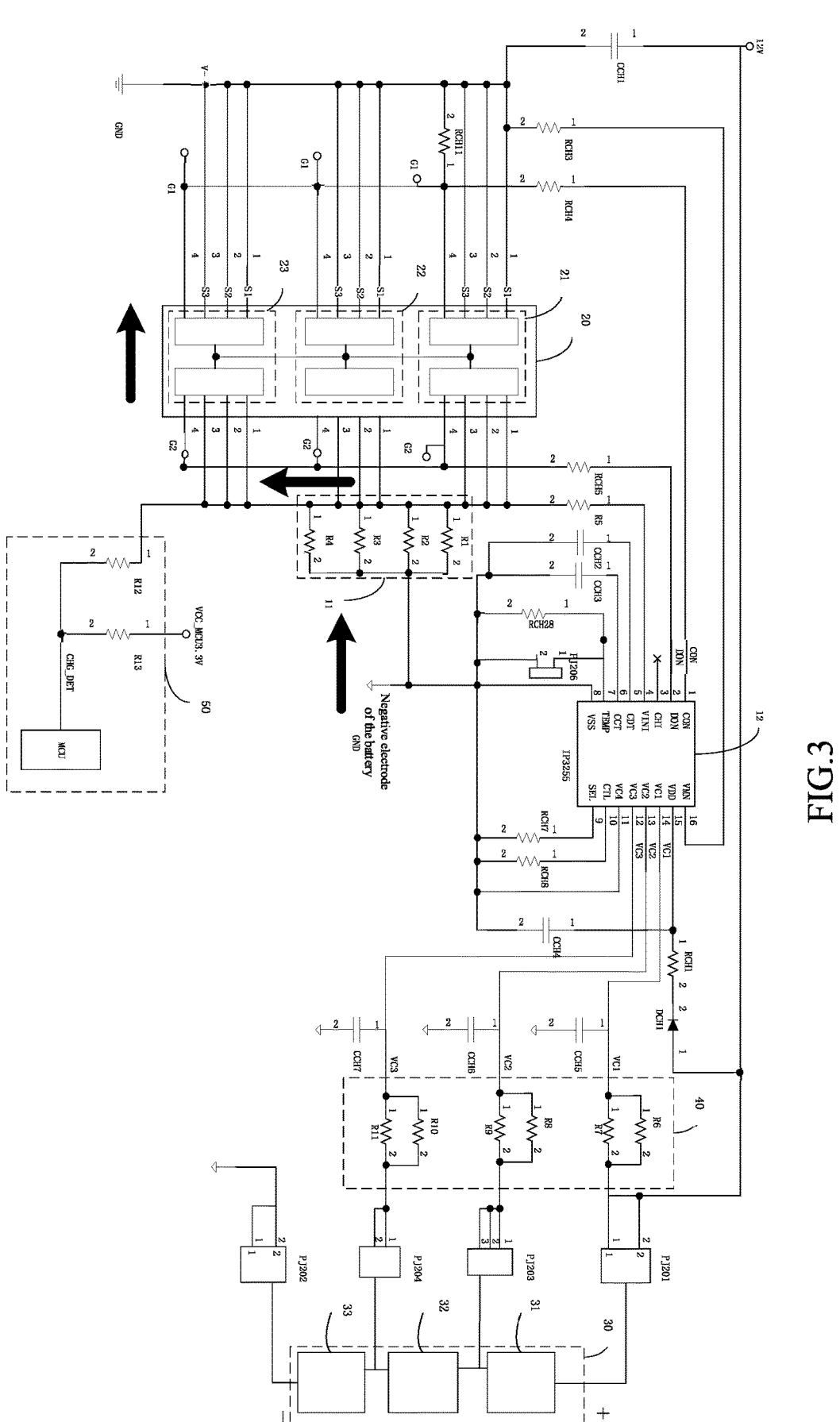
FIG. 3 is a schematic diagram of current flow direction in a battery charge and discharge control system according to an example of the present disclosure.
Figure 4:
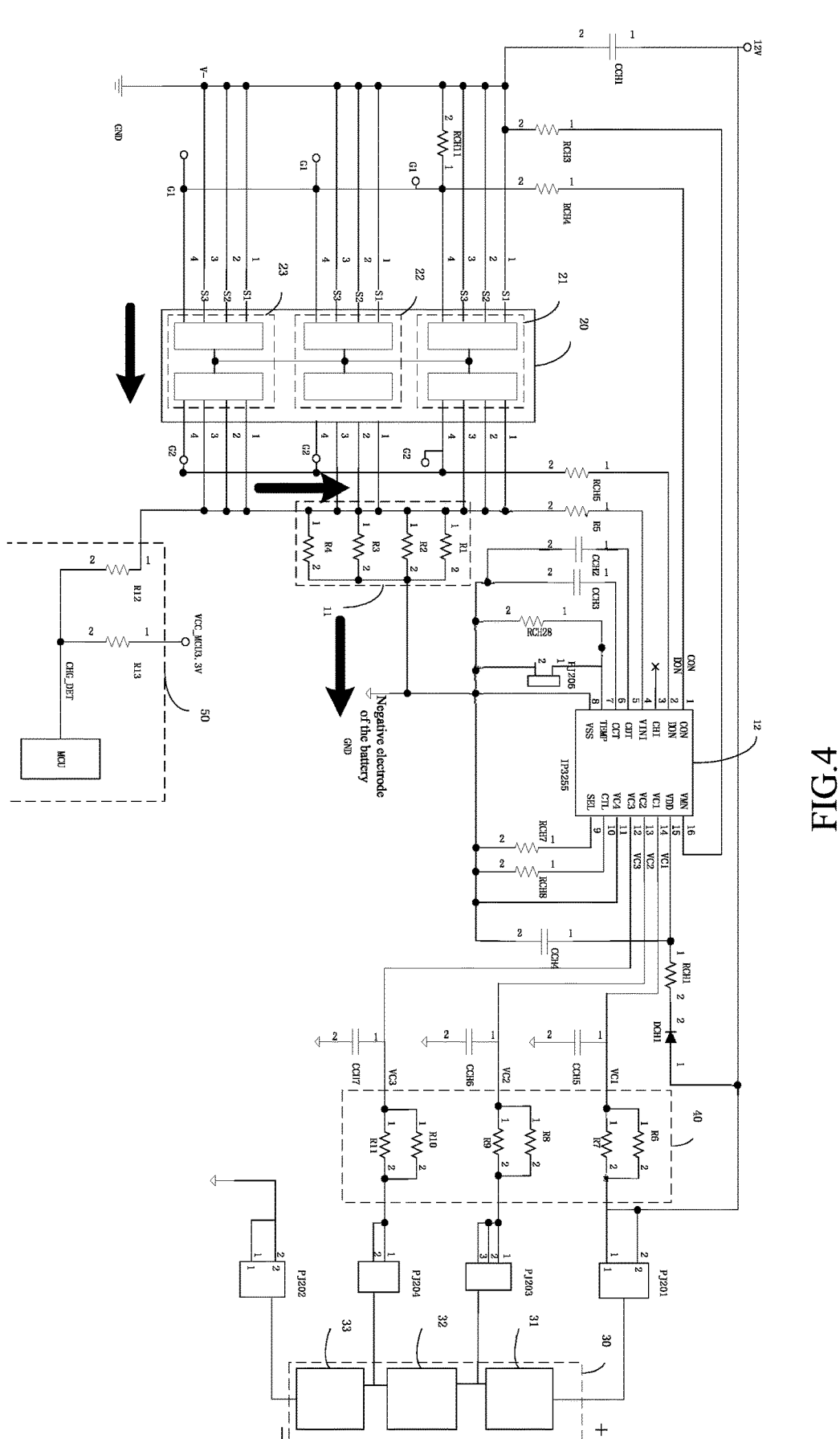
FIG. 4 is a schematic diagram of current flow direction in a battery charge and discharge control system according to another example of the present disclosure.

Specifically, as shown in FIG. 2, the first sampling resistor circuit 11 may include sampling resistors R1, R2, R3, R4, wherein the sampling resistors R1, R2, R3, R4 are connected in parallel, one terminal of the sampling resistors R1, R2, R3, R4 is connected to the power supply negative terminal V−, and the other terminal of the sampling resistors R1, R2, R3, R4 is connected to the negative electrode of the battery 30. When the external power supply charges the battery 30 with a constant current, the current flows from the negative electrode of the battery 30 to the power supply negative terminal V−; when the battery is discharged, current flows from the power supply negative terminal V− to the negative electrode of the battery 30. It should be noticed that, the first sampling resistor circuit 11 may include only one, two or three of the sampling resistors R1, R2, R3, and R4, or may include more than one sampling resistor, the specific number of which may be selected as required.

A controllable switch circuit 20 is connected between the first node and the power supply negative terminal V−. The controllable switch circuit 20 includes a control terminal connected to the battery protection chip 12, and may be configured to turn on or off the connection between the power supply negative terminal V− and the negative electrode of the battery 30 under the control of the battery protection chip 12, thereby controlling the on and off of the connection circuit between the external power supply and the battery 30.

According to the battery charge and discharge control system of the embodiment of the invention, the first sampling resistor circuit 11 and the battery protection chip 12 can achieve the overcurrent detection when the battery 30 is charged and discharged. The connection state of the external power supply/load and the battery 30 can be controlled by the controllable switch circuit 20, for example, when the charging overcurrent occurs, the controllable switch circuit 20 can be controlled to be disconnected so as to prohibit charging the battery. Therefore, compared with the charging circuit in the related art, a battery management chip is omitted, thereby reducing the circuit board area, the failure rate and the cost.

In one embodiment of the present disclosure, the battery protection chip 12 is used for obtaining a first detection voltage through the overcurrent detection pin, judging whether the battery 30 has an overdischarge phenomenon according to the first detection voltage, and controlling the controllable switch circuit 20 to be disconnected when the overdischarge phenomenon occurs in the battery 30, so as to prohibit charging or discharging the battery 30.

Specifically, referring to FIG. 2, the battery protection chip 12 may be an IP3255 battery protection IC. The fourth pin VINI of the IP3255 battery protection IC is an overcurrent detection pin, and the overcurrent detection pin is connected to one terminal of each sampling resistor through a resistor R5. When the battery 30 is discharged, if the first detection voltage is smaller than a certain value $V_{SS}$, and the voltage difference between $V_{SS}$ and the first detection voltage is larger than a set voltage such as $V_{IOV1}$, and this state is maintained for a certain time $t_{IOV1}$ or more, the battery 30 enters an overcurrent state. In the overcurrent state, the voltage of the pin DON of the IP3255 battery protection IC becomes $V_{SS}$, and the discharge MOS transistor (Metal Oxide Semiconductor Field Effect Transistor) connected to the pin DON in the IP3255 battery protection IC is turned off, thereby stopping the discharge, that is, the discharge of the battery 30 is prohibited. In addition, the CON terminal becomes high impedance, the charge MOS transistor connected to the pin CON is turned off, and the pin VMN is pulled down to $V_{SS}$ through an internal resistor. When the external power supply is connected or the load current is less than a certain value, such as 10 μA, the discharge overcurrent state is released. When charging the battery, if the first detection voltage is larger than a certain value $V_{SS}$, and the voltage difference between the first detection voltage and $V_{SS}$ is larger than a set voltage such as $V_{CIOV}$, and the state is maintained at or above a certain time $t_{CIOV}$, the battery enters an overcurrent state. In the overcurrent state, the voltage of pin CON becomes high impedance, and the charge MOS transistor is turned off, thus stopping charging. After the external power supply is removed, the charging overcurrent state is released.

In one embodiment of the present disclosure, the power supply positive terminal V+ is further used to connect one terminal of the load, and the power supply negative terminal V− is further used to connect the other terminal of the load, so that when the power supply positive terminal V+ and the power supply negative terminal V− are connected to the external power supply and the load at the same time, the external power supply is directly connected to the load and can directly supply power to the load. The battery protection chip 12 further includes a power input pin (such as pin VDD in FIG. 2) and an external circuit access detection pin (such as pin VMN in FIG. 2). The power input pin is connected to the power positive terminal V+ and the positive electrode of the battery 30. The external circuit access detection pin is connected to the power supply negative terminal V− through the preset resistor RCH3. The battery protection chip 12 is used for obtaining a second detection voltage by the external circuit access detection pin, determining the external circuit currently accessed according to the second detection voltage, and controlling the controllable switch circuit 20 according to the external circuit currently accessed.

For example, if the external circuit currently connected is an external power supply, the battery protection chip 12 can control the controllable switch circuit 20 to conduct so that the external power supply charges the battery 30. If the external circuit currently connected is a load, the battery protection chip 12 can control the controllable switch circuit 20 to conduct, so that the battery 30 can supply power to the load, thereby improving the safety of charging and discharging through the configuration of the controllable switch circuit 20.

It should be noted that, when it is detected that both the external power supply and the load are connected, the battery protection chip 12 can control the controllable switch circuit 20 to be turned on, and at this time, the external power supply can charge the battery 30 and supply power to the load.

As an example, the controllable switch circuit 20 may include a plurality of (three are shown in FIG. 2, the number of which may be set according to power requirements) parallel switch loops (denoted as 21, 22, 23, respectively), each switch loop is connected to a charge MOS transistor and a discharge MOS transistor connected in series. For example, each switch loop is formed by two switch transistor assemblies (including MOS transistors and freewheeling diodes) connected in series. The gate of the charge MOS transistor connected to the power supply negative terminal V− in the switch loop is connected to the pin CON of the IP3255 battery protection IC, and the gate of the discharge MOS transistor connected to the first node of the first sampling resistor circuit 11 in the switch loop is connected to the pin DON of the IP3255 battery protection IC.

Specifically, when the IP3255 battery protection IC determines to access an external power supply (e.g., a 12V power supply) based on the second detection voltage, the pin CON of the IP3255 battery protection IC outputs a high level, and pin DON outputs a low level. The IP3255 battery protection IC controls the charge MOS transistors of each switch loop in the controllable switch circuit 20 to be turned on (of course, if there is only one switch loop, the switch loop is controlled to be turned on). At this time, referring to FIG. 3, the level of one terminal of the first node of the first sampling resistor circuit 11 is lower than the level of the other terminal, and current flows from the negative electrode of the battery 30 to the power supply negative terminal V−.

In the absence of external power access, when the IP3255 battery protection IC determines that there is a load access according to the second detection voltage, the pin DON of the IP3255 battery protection IC outputs a high level and the pin CON outputs a low level. The IP3255 battery protection IC controls the discharge MOS transistor of the controllable switch circuit 20 to turn on. At this time, referring to FIG. 4, the level of one terminal of the first node of the first sampling resistor circuit 11 is higher than the level of the other terminal, and the current flows from the power supply negative terminal V− to the negative electrode of the battery.

Figure 5:
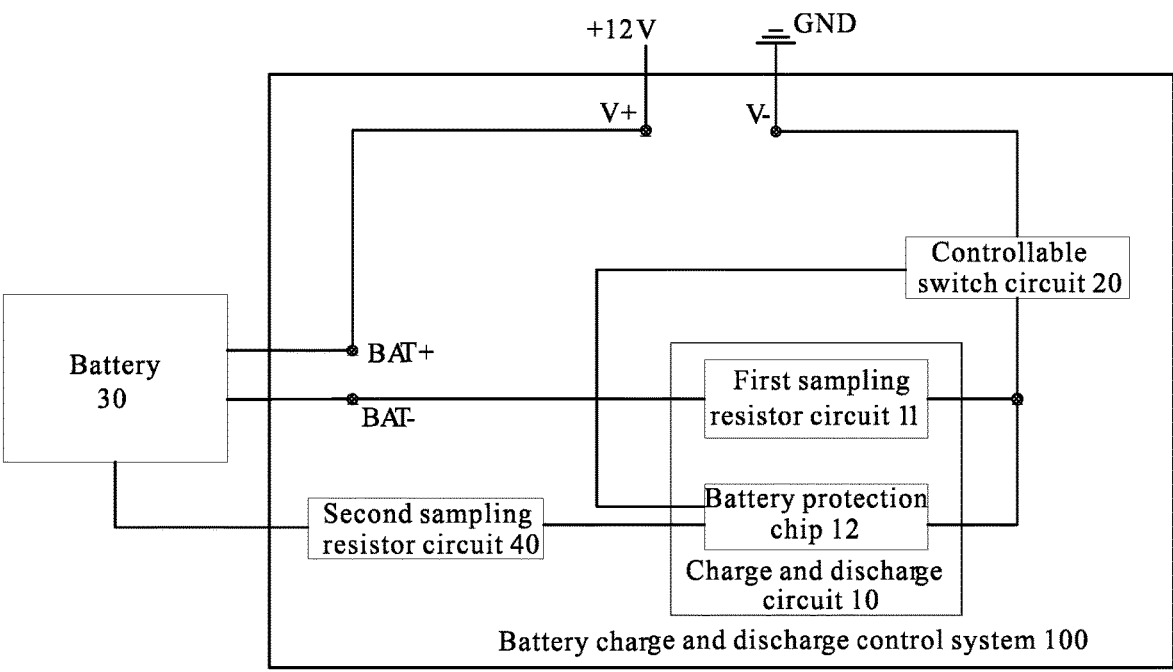
FIG. 5 is a structural block diagram of a battery charge and discharge control system according to a second embodiment of the present disclosure.

In one embodiment of the present disclosure, the system further includes a second sampling resistor circuit 40 and FIG. 5 is a block diagram of a battery charge and discharge control system 100 according to another embodiment of the present disclosure. Referring to FIG. 5 a second sampling resistor circuit 40 is connected between the battery 30 and the battery voltage detection pin of the battery protection chip 12. The battery protection chip 12 is used for obtaining the third detection voltage through the battery voltage detection pin. When the third detection voltage is greater than the first preset voltage, the controllable switch circuit 20 is controlled to be disconnected to protect the battery 30 from overcharge, and when the third detection voltage is less than the second preset voltage, the controllable switch circuit 20 is controlled to be disconnected to protect the battery 30 from overdischarge. Herein, the second preset voltage is less than the first preset voltage.

As an example, the second sampling resistor circuit 40 includes a plurality of sampling resistor sub-circuits, each of which is disposed corresponding to a battery cell of the battery 30 and a battery voltage detection pin of the battery protection chip 12, and each of the sampling resistor sub-circuits includes a plurality of sampling resistors in parallel.

Specifically, referring to FIG. 2, for a battery 30 formed by three battery cells (denoted as 31, 32, and 33, respectively) in series is connected to a second sampling resistor circuit 40 through connection terminals PJ201 to PJ204. The second sampling resistor circuit 40 may include sampling resistors R6, R7, R8, R9, R10, R11, herein R6, R7 are connected in parallel, and R6, R7 are connected in parallel between pin VC1 of the IP3255 battery protection IC and the positive electrode of the battery cell 31; R8 and R9 are connected in parallel, and the parallel R8 and R9 are connected between the pin VC2 of the IP3255 battery protection IC and the positive electrode of the battery cell 32; R10 and R11 are connected in parallel, and the parallel R10 and R11 are connected between the pin VC3 of the IP3255 battery protection IC and the positive electrode of the battery cell 33. For a battery cell with a rated voltage of 3.7 V, when the IP3255 battery protection IC detects that the third detection voltage of any battery cell is greater than the first preset voltage, that is, the overcharge voltage of 4.2 V, and lasts longer than the overcharge voltage protection delay time, the pin CON becomes high impedance, and the charge MOS transistor is turned off, thereby stopping charging and achieving overcharge protection for the battery 30. For battery cells with rated voltage of 3.7 V, when the IP3255 battery protection IC detects that the third detection voltage of any battery cell is less than the second preset voltage, i.e., the overdischarge voltage of 2.7 V, and lasts longer than the overdischarge voltage protection delay time, the voltage of the pin DON becomes low and the CON becomes high impedance, the discharge MOS transistor is turned off and the discharge is stopped, thereby achieving the overdischarge protection of the battery 30, wherein the second preset voltage is less than the first preset voltage.

Figure 6:
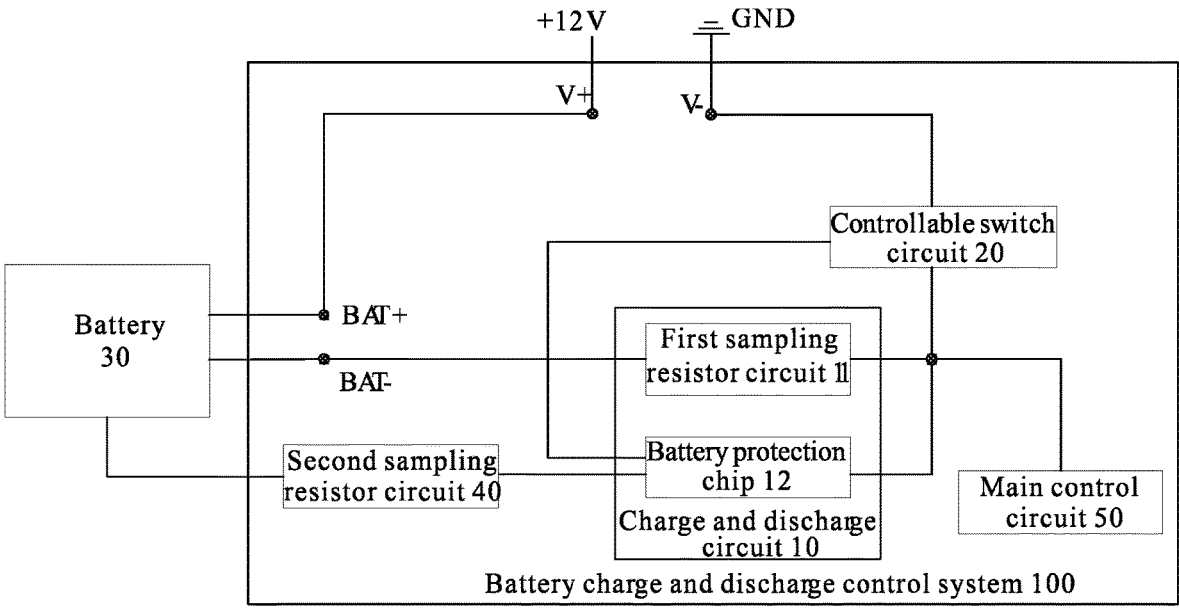
FIG. 6 is a structural block diagram of a battery charge and discharge control system according to a third embodiment of the present disclosure.

In one embodiment of the present disclosure, the system further includes a main control circuit 50. FIG. 6 is another structural block diagram of a battery charge and discharge control system 100 according to an embodiment of the present disclosure. Referring to FIG. 6, a voltage detection terminal of the main control circuit 50 is connected to the first node to obtain a fourth detection voltage and determine state information of the battery 30 based on the fourth detection voltage.

Wherein, the main control circuit 50 includes a first resistor R12, one terminal of which is connected to the first node; a second resistor R13, one terminal of which is connected to the other terminal of the first resistor R12, and a second node is provided between the first resistor R12 and the second resistor R13, and the other terminal of the second resistor R13 is connected to a power supply of a preset voltage; a main control chip MCU, and the voltage sampling pin of the main control chip MCU is connected to the second node to obtain the fourth detection voltage.

As one example, the state information of the battery 30 includes a charge state, a discharge state, and a stop state, wherein the main control circuit 50 determines a fourth detection voltage, and when the fourth detection voltage is less than a preset voltage threshold, the main control circuit 50 determines that the battery 30 is in a charge state; when the fourth detection voltage is greater than a preset voltage threshold, the main control circuit 50 determines that the battery 30 is in a discharge state; and when the fourth detection voltage is equal to a preset voltage threshold, the main control circuit 50 determines that the battery 30 is in a stop state. The main control circuit 50 can further send out prompt information corresponding to the state information according to the state information of the battery 30 to prompt the state information. For example, the main control circuit 50 can be connected to indicator lights of different colors, and when the battery 30 is in the charge state, the red indicator light can be lit; when the battery 30 is fully charged, a green indicator light can be lit.

Specifically, the main control chip MCU can compare the fourth detection voltage with the reference voltage of the voltage sampling pin CHG_DET, such as 0.3 V, to determine the state information of the battery 30, wherein the reference voltage of the voltage sampling pin CHG_DET is obtained by dividing the first resistor R12 and the second resistor R13. Specifically, when there is no current flow between the negative electrode of the battery 30 and the power supply negative terminal V−, the voltage at the first node is 0V, and the preset voltage, such as 3.3 V, is divided by the first resistor R12 and the second resistor R13, and the voltage at both terminals of the first resistor R12 is the reference voltage of the sampling pin CHG_DET.

Take the reference voltage of the voltage sampling pin CHG_DET as 0.3V as an example, for example, the fourth detection voltage obtained by sampling is 0.1V, which is less than the preset voltage threshold, i.e., the reference voltage of 0.3 V of the voltage sampling pin CHG_DET, indicating that the current flows from the negative electrode of the battery 30 to the power supply negative terminal V−, and the main control circuit 50 determines that the battery 30 is in a charge state, and may send out a corresponding prompt message; the fourth detection voltage obtained by sampling is 0.5 V, which is greater than the preset voltage threshold value of 0.3 V, indicating that the current flows from the power supply negative terminal V− to the negative electrode of the battery 30, and the main control circuit 50 determines that the battery 30 is in a discharge state and may send out corresponding prompt information; the fourth detection voltage obtained by sampling is 0.3 V, which is equal to the preset voltage threshold value of 0.3 V, indicating that there is no current flow between the negative electrode of the battery 30 and the power supply negative terminal V−, and the main control circuit 50 determines that the battery 30 is in a stop state and may send out corresponding prompt information.

Therefore, compared with the prior art, the battery charge and discharge control system of the embodiment of the present disclosure can achieve the determination of the charge and discharge state without the battery charging management IC, thereby achieving the charge and discharge control, and the control device has lower design cost and less occupied space.

Alternatively, the power supply positive terminal V+, the power supply negative terminal V−, the charge and discharge circuit 10, the controllable switch circuit 20, the second sampling resistor circuit 40 and the main control circuit 50 may all be arranged on the same circuit board (such as a PCB board).

To sum up, compared with the prior art, the battery charge and discharge control system of the embodiment of the present disclosure does not need a battery charging management chip, has simple circuit design, can effectively reduce the area of the circuit board, and can reduce the circuit failure rate and the production cost.

Figure 7:
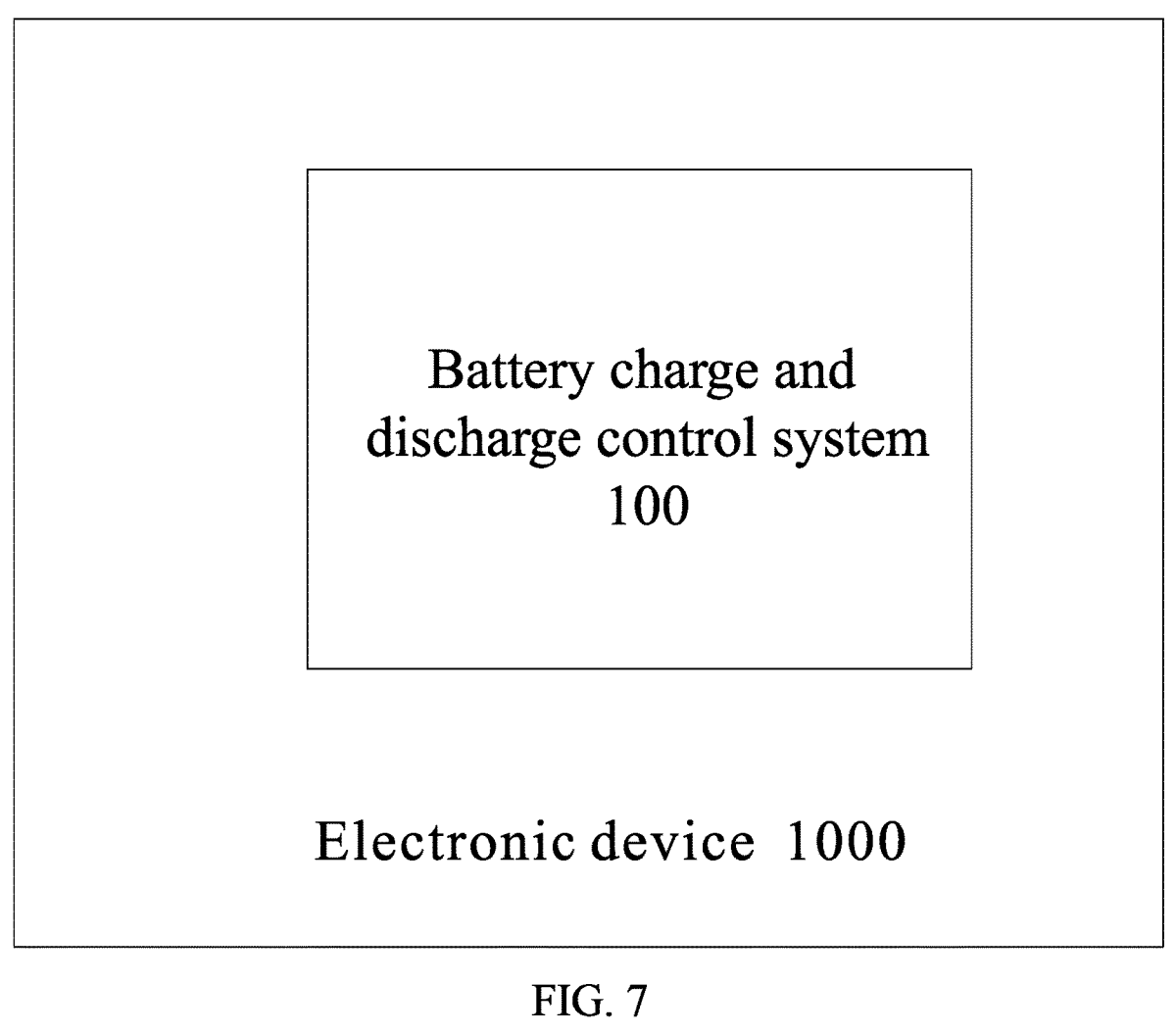

Further, the present disclosure proposes an electronic device 1000, as shown in FIG. 7, which includes the above-mentioned battery charge and discharge control system 100.

Optionally, the electronic device 1000 has a display which may be an electronic screen-displayed mobile street sign, a commercial display, or a billboard, and the size of the display may be 32 inches.

Compared with the prior art, the electronic device with the battery charge and discharge control system installed in the embodiment of the present disclosure does not need a charging management chip, has simple circuit design, can effectively reduce the area of the circuit board, and can reduce the circuit failure rate and the production cost.

In the above description, the description with reference to the terms "an embodiment", "some embodiments", "examples", "specific exemplary embodiment", or "some examples" or the like means that the specific features, structures, materials, or characteristics described in conjunction with the embodiments or examples are included in at least one embodiment or example of the present disclosure. In this description, the exemplary description of the above terms is not necessarily directed to the same embodiment or example. Moreover, the specific features, structures, materials, or characteristics described may be combined in any one or more embodiments or examples in a proper way.

In the description of the present disclosure, it should be understood that, orientation or position relationships indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like are based on the orientation or position relationships shown in the drawings, and are only for the convenience of description of the present disclosure and simplification of the description, but are not intended to indicate or imply that the mentioned device or element must have a specific orientation, or be constructed and operated in a particular orientation, and therefore they should not be construed as limitations on the present disclosure.

In addition, the terms "first" and "second" are used for descriptive purposes only and cannot be interpreted as indicating or implying relative importance or implicitly indicating the number of technical features indicated. Thus, the features defined by "first" and "second" may explicitly or implicitly include at least one of the features. In the description of the present disclosure, the meaning of "a plurality of" refers to "at least two", such as "two" or "three", unless otherwise explicitly or specifically defined.

In the present disclosure, unless otherwise clearly specified and defined, terms "installed", "connected", "coupled", "fixed" and other terms should be broadly understood, for example, to be connected fixedly or connected detachably, or integrated; or to be mechanically connected or electrically connected; or to be directly connected, or be indirectly connected through an intermediary, or be internally connected between two elements or be interacted between two elements, unless otherwise clearly specified. Those of ordinary skills in the art can understand the specific meanings of the above terms in the present disclosure according to specific situations.

In the present disclosure, unless otherwise clearly specified and defined, the first feature being "on" or "under" the second feature may mean that the first feature and second feature are in direct contact, or the first feature and second feature are in indirect contact through an intermediary. Moreover, the first feature being "over", "above" and "on" the second feature may mean that the first feature is directly above or obliquely above the second feature, or simply mean that a level of the first feature is greater than that of the second feature. The first feature being "below", "beneath" and "under" the second feature may mean that the first feature is directly below or obliquely below the second feature, or simply mean that a level of the first feature is less than that of the second feature.

Although the embodiments of the present disclosure are shown and described above, it can be understood that the above embodiments are exemplary and cannot be interpreted as limitations to the present disclosure. A person skilled in the art may change, modify, replace, and vary the above embodiments within the scope of the present disclosure.

The invention claimed is:

1. A battery charge and discharge control system, comprising:

a power supply positive terminal and a power supply negative terminal, wherein the power supply positive terminal is used for connecting a positive terminal of an external power supply, and the power supply negative terminal is used for connecting a negative terminal of the external power supply;

a battery positive terminal and a battery negative terminal, the battery positive terminal is used for connecting a positive electrode of the battery, the battery negative terminal is used for connecting a negative electrode of the battery, and the battery positive terminal is connected to the power supply positive terminal;

a charge and discharge circuit, which comprises a first sampling resistor circuit and a battery protection chip, one terminal of the first sampling resistor circuit is connected to the power supply negative terminal, a first node is provided between the first sampling resistor circuit and the power supply negative terminal, the other terminal of the first sampling resistor circuit is connected to the negative electrode of the battery, the battery protection chip comprises an overcurrent detection pin, and the overcurrent detection pin is connected to the first node;

a controllable switch circuit, which is connected between the first node and the power supply negative terminal, the controllable switch circuit comprises a control terminal connected to the battery protection chip, and the controllable switch circuit is configured to turn on or off a connection between the power supply negative terminal and the negative electrode of the battery under control of the battery protection chip; and a second sampling resistor circuit, connected between the battery and a battery voltage detection pin of the battery protection chip, wherein the second sampling resistor circuit comprises a plurality of sampling resistors, wherein the battery comprises a plurality of battery cells in series, wherein the battery protection chip comprises a plurality of battery voltage detection pins, and wherein every two sampling resistors in parallel in the plurality of sampling resistors are arranged respectively between a positive electrode of one battery cell of the plurality of battery cells and one battery voltage detection pin of the plurality of battery voltage detection pins.

2. The battery charge and discharge control system according to claim 1, wherein the battery protection chip is used for obtaining a first detection voltage through the overcurrent detection pin, determining whether the battery has a current overdischarge phenomenon according to the first detection voltage, and controlling the controllable switch circuit to be disconnected in a case that the battery has the current overdischarge phenomenon to prohibit charging or discharging the battery.

3. The battery charge and discharge control system according to claim 1, wherein the power supply positive terminal is further used for connecting one terminal of a load, the power supply negative terminal is further used for connecting the other terminal of the load, the battery protection chip further comprises a power input pin and an external circuit access detection pin, the power input pin is connected to the power supply positive terminal and the positive electrode of the battery, the external circuit access detection pin is connected to the power supply negative terminal through a preset resistance, the battery protection chip is used for acquiring a second detection voltage by the external circuit access detection pin, determining an external circuit currently connected according to the second detection voltage, and performing corresponding control on the controllable switch circuit according to the external circuit currently connected.

4. The battery charge and discharge control system according to claim 3, wherein the battery protection chip is used for:

controlling the controllable switch circuit to conduct to allow the external power supply to charge the battery in a case that the current connected external circuit is the external power supply.

5. The battery charge and discharge control system according to claim 4, wherein the controllable switch circuit comprises a plurality of parallel switch loops, wherein a charge MOS transistor and a discharge MOS transistor connected in series are connected in each switch loop, and the charge MOS transistor is connected to the power supply negative terminal, the discharge MOS transistor is connected to the first node, the charge MOS transistor and the discharge MOS transistor are connected in parallel with reverse diodes, a control terminal of the charge MOS transistor is connected to a charging control pin of the battery protection chip, and a control terminal of the discharge MOS transistor is connected to a discharging control pin of the battery protection chip.

6. The battery charge and discharge control system according to claim 1, further comprising:

a main control circuit, wherein a voltage detection terminal of the main control circuit is connected to the first node to obtain a fourth detection voltage, and the main control circuit is configured to determine state information of the battery according to the fourth detection voltage.

7. The battery charge and discharge control system according to claim 6, wherein the state information of the battery comprises a charge state, a discharge state and a stop state, wherein the main control circuit is configured to determine the fourth detection voltage, in a case that the fourth detection voltage is less than a preset voltage threshold, the battery is determined to be in a charge state by the main control circuit;

in a case that the fourth detection voltage is greater than the preset voltage threshold, the battery is determined to be in a discharging state by the main control circuit; and in a case that the fourth detection voltage is equal to a preset voltage threshold, the battery is determined to be in a stop state by the main control circuit.

8. The battery charge and discharge control system according to claim 6, wherein the main control circuit comprises:

a first resistor, one terminal of the first resistor is connected to the first node;

a second resistor, one terminal of the second resistor is connected to the other terminal of the first resistor, and a second node is provided between the first resistor and the second resistor, and the other terminal of the second resistor is connected to a power supply of a preset voltage; and a main control chip, a voltage sampling pin of the main control chip is connected to the second node to obtain the fourth detection voltage.

9. An electronic device, comprising:

the battery charge and discharge control system according to claim 1.

10. The battery charge and discharge control system according to claim 7, wherein the main control circuit comprises:

a first resistor, one terminal of the first resistor is connected to the first node;

a second resistor, one terminal of the second resistor is connected to the other terminal of the first resistor, and a second node is provided between the first resistor and the second resistor, and the other terminal of the second resistor is connected to a power supply of a preset voltage; and a main control chip, a voltage sampling pin of the main control chip is connected to the second node to obtain the fourth detection voltage.

11. The battery charge and discharge control system according to claim 3, wherein the battery protection chip is used for:

controlling the controllable switch circuit to conduct to allow the battery to supply power to the load in a case that the current connected external circuit is the load.

12. The battery charge and discharge control system according to claim 1, wherein the battery protection chip is used for obtaining a third detection voltage through the battery voltage detection pin, and controlling the controllable switch circuit to be disconnected to carry out overcharge protection on the battery in a case that the third detection voltage is greater than a first preset voltage, and controlling the controllable switch circuit to be disconnected to carry out overdischarge protection on the battery in a case that the third detection voltage is less than a second preset voltage, wherein the second preset voltage is less than the first preset voltage.

13. The battery charge and discharge control system according to claim 5, wherein the battery protection chip is used for:

controlling the charge MOS transistor to conduct to allow the external power supply to charge the battery in a case that the currently connected external circuit is the external power supply.

14. The battery charge and discharge control system according to claim 5, wherein the battery protection chip is used for:

controlling the discharge MOS transistor to conduct to allow the battery to supply power to the load in a case that the currently connected external circuit is the load.

* * * * *